(12) United States Patent
Pratt et al.

(10) Patent No.: US 8,740,462 B2
(45) Date of Patent: Jun. 3, 2014

(54) SEAL ASSEMBLY

(75) Inventors: Jonathan S. Pratt, Holden, MA (US); Joseph N. Scialabba, Worcester, MA (US); David G. Titus, West Boylston, MA (US)

(73) Assignee: Siemens Industry, Inc., Alpharetta, GA (US)

( * ) Notice: Subject to any disclaimer, the term of this patent is extended or adjusted under 35 U.S.C. 154(b) by 549 days.

(21) Appl. No.: 12/841,777

(22) Filed: Jul. 22, 2010

(65) Prior Publication Data
US 2012/0018956 A1 Jan. 26, 2012

(51) Int. Cl.
*F16J 15/34* (2006.01)

(52) U.S. Cl.
USPC .............................. 384/138; 384/486; 277/371

(58) Field of Classification Search
USPC ................. 277/345, 348, 374, 384, 500, 553, 277/370–371
See application file for complete search history.

(56) References Cited

U.S. PATENT DOCUMENTS

| | | | |
|---|---|---|---|
| 2,210,823 A | 8/1940 | Bernstein | |
| 2,877,029 A * | 3/1959 | Peguet et al. | 277/374 |
| 2,888,281 A * | 5/1959 | Ratti | 277/366 |
| 2,906,565 A | 9/1959 | Scherba | |
| 2,950,932 A * | 8/1960 | Gilbert | 277/365 |
| 3,029,081 A * | 4/1962 | Marsh | 277/368 |
| 3,090,629 A * | 5/1963 | Lee et al. | 277/368 |
| 3,275,334 A * | 9/1966 | Voitik | 277/374 |
| 3,368,819 A * | 2/1968 | Otto | 277/366 |
| 3,511,511 A * | 5/1970 | Voitik | 277/366 |
| 3,523,692 A * | 8/1970 | Otto | 277/366 |
| 3,811,688 A * | 5/1974 | Smith | 277/369 |
| 3,892,446 A * | 7/1975 | Rich, Jr. | 384/130 |
| 4,183,540 A * | 1/1980 | Hytonen | 277/388 |
| 4,348,031 A * | 9/1982 | Johnston | 277/363 |
| 4,501,429 A * | 2/1985 | White | 277/368 |
| 4,910,987 A | 3/1990 | Woodrow | |
| 5,605,436 A * | 2/1997 | Pedersen | 415/170.1 |
| 2005/0167927 A1* | 8/2005 | Mormile et al. | 277/500 |

* cited by examiner

*Primary Examiner* — Vishal Patel

(57) ABSTRACT

A seal assembly is disclosed for use between a housing and a rotatable shaft protruding exteriorly from the housing, with the shat being journalled for rotation in an eccentric cartridge which in turn is rotatably adjustable. The seal assembly comprises a circular flinger mounted on the shaft for rotation therewith. The flinger has radially outwardly projecting flanges defining an axial space therebetween. A seal carrier surrounds the flinger and has axially spaced first and second inner rims projecting radially inwardly into the space between the flanges of the flinger. Ring seals are carried by the seal carriers. The inner rims are resiliently urged to maintain the ring seals in contact with the flinger flanges.

2 Claims, 4 Drawing Sheets

SEAL ASSEMBLY

BACKGROUND OF THE INVENTION

1. Field of the Invention

This invention relates generally to so called "cantilevered" rolling mills, where the work rolls are mounted in an overhung fashion on the ends of roll shafts which protrude from housings containing the shaft bearings, gears, roll parting adjustment mechanisms, etc. The invention is concerned in particular with an improved seal assembly for preventing leakage of lubricants from such housings and for preventing ingress of external contaminants, e.g., cooling water and entrained dirt, mill scale, etc.

2. Description of the Prior Art

As disclosed for example in U.S. Pat. No. 4,910,987 (Woodrow), known seal assemblies typically employ fixed dual lip seals in contact with the adjacent surfaces of flingers mounted on the rotating roll shafts. Such arrangements suffer from several drawbacks, including leakage resulting from rapid wear and thermal degradation of the seal lips, and an inability to self compensate for misalignments between rotating and stationary components resulting from bearing clearances and load induced shaft deflections.

SUMMARY OF THE INVENTION

In accordance with one aspect of the present invention, a circular flinger is mounted on the roll shaft. The flinger has axially spaced radially outwardly projecting flanges. A seal carrier surrounds the flinger. The seal carrier has axially spaced inner rims projecting radially into the space between the flinger flanges. Ring seals are carried by the seal carrier's inner rims. The inner rims are resiliently urged apart to maintain the ring seals in sealing contact with the flinger flanges as the ring seals undergo normal frictional wear.

According to another aspect of the present invention, the seal carrier is self aligning to compensate for misalignments between rotating and stationary components resulting from bearing clearances and load induced shaft deflections, thereby maintaining optimum positioning and contact of the ring seals with the flinger flanges.

These and other features and attendant advantages of the present invention will now be described in further detail with reference to the accompanying drawings, wherein:

DETAILED DESCRIPTION

Figure 1:
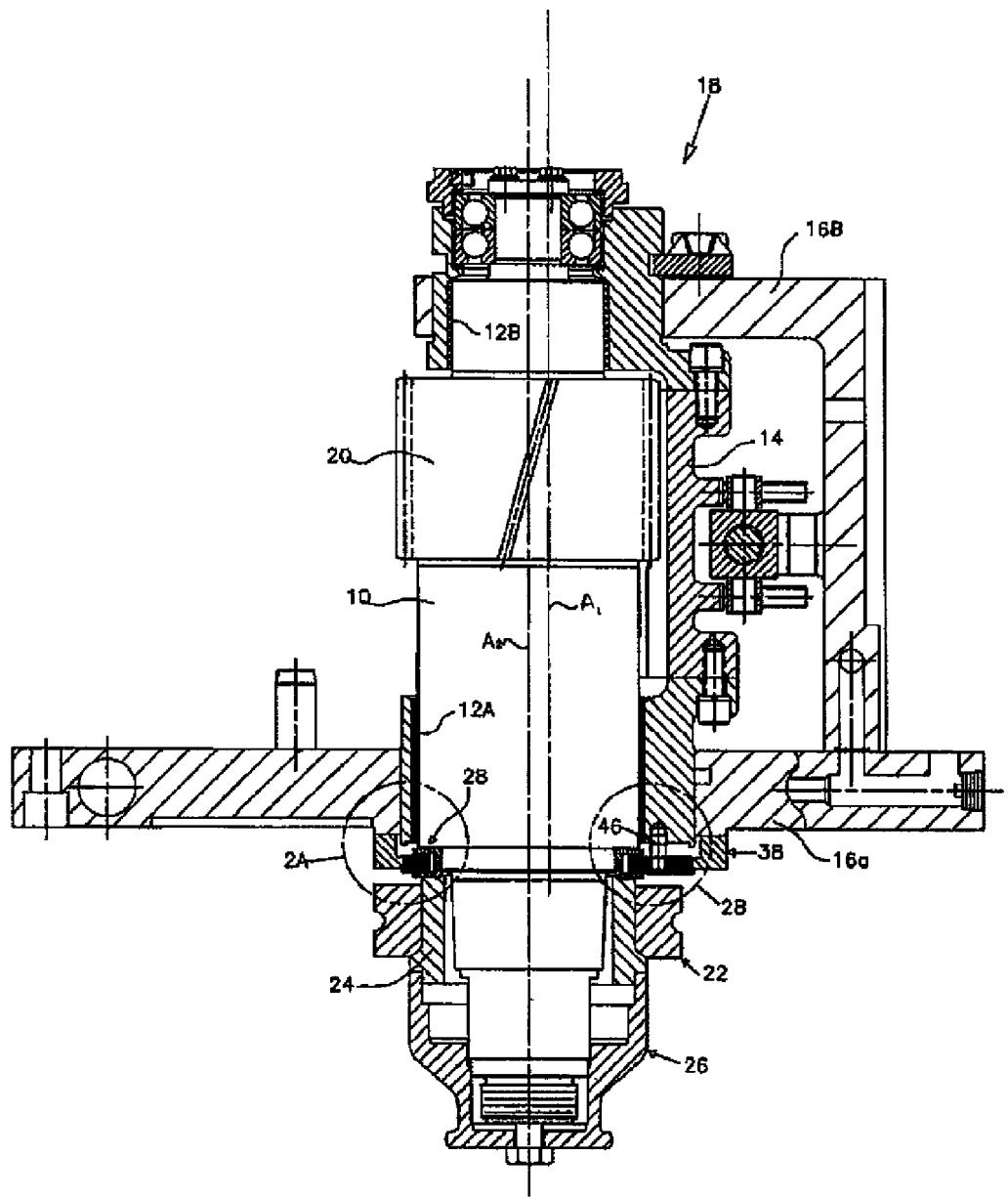
FIG. 1 is a partial sectional view take through the roll stand of a cantilevered rolling mill, showing one of the roll shafts projecting externally from the housing, with a seal assembly according to the present invention providing a seal between the shaft and the housing.

With reference initially to FIG. 1, a portion of a cantilevered rolling mill is shown in which a roll shaft 10 is journalled for rotation in sleeve bearings 12a, 12b carried in an eccentric cartridge 14, which in turn is journalled for rotation in the front and back plates 16a, 16b of a housing assembly 18. Shaft 10 includes a gear 20 which meshes with another gear of a companion shaft (not shown). An end of the shaft protrudes exteriorly from the front housing plate 16a. A work roll 22 is carried on the exteriorly protruding shaft end, and is fixed in place by an internal tapered sleeve 24 and a cap 26. A seal assembly in accordance with the present invention is generally indicated at 28.

Figure 2A:
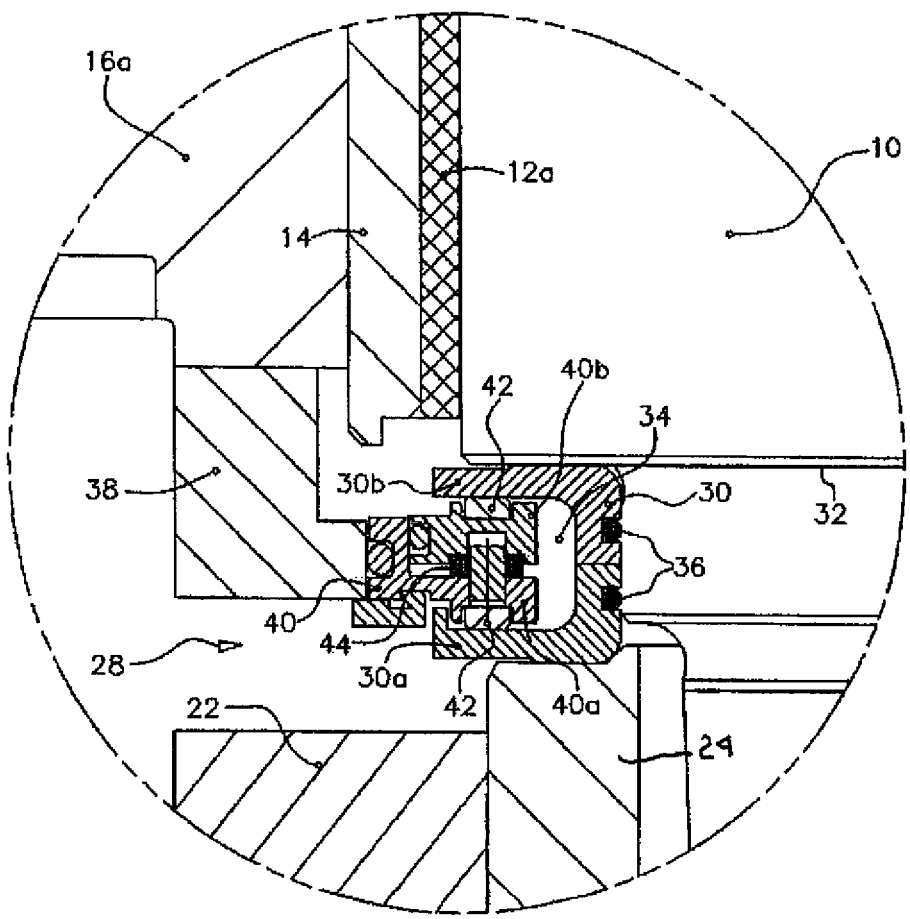
FIGS. 2A and 2B are enlarged views of the circled areas denoted "2A" and "2B" in FIG. 1.
Figure 2B:
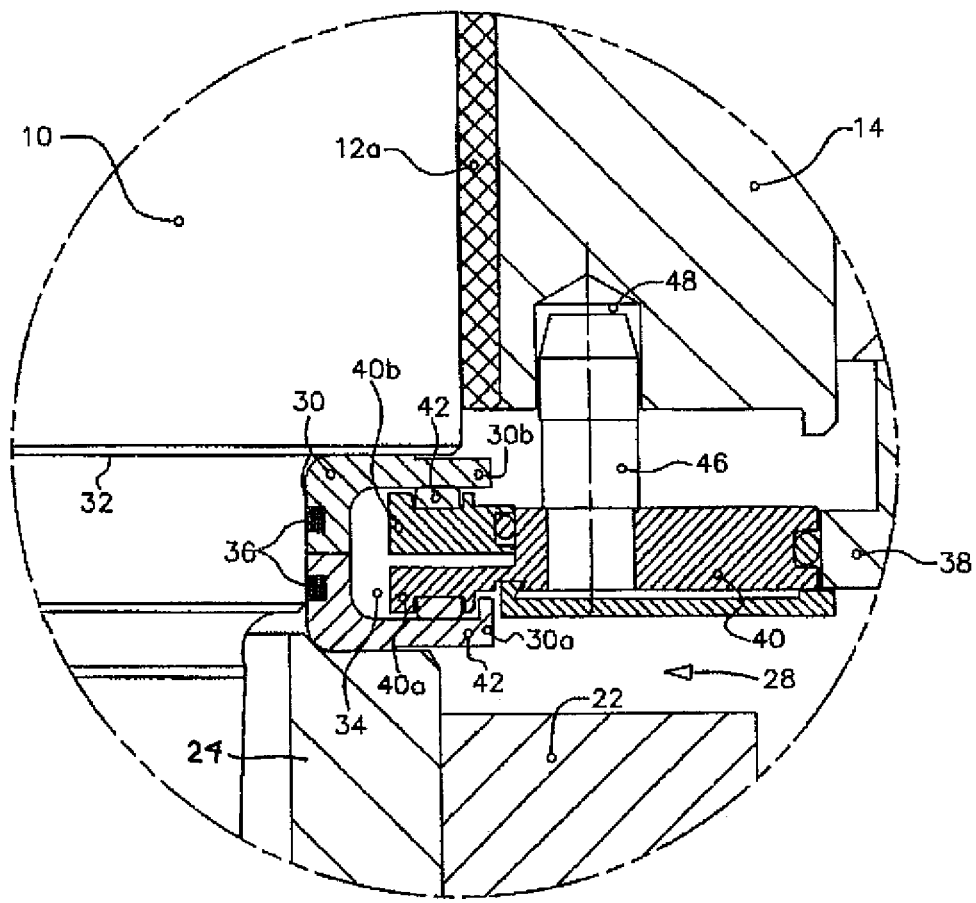
Figure 3:
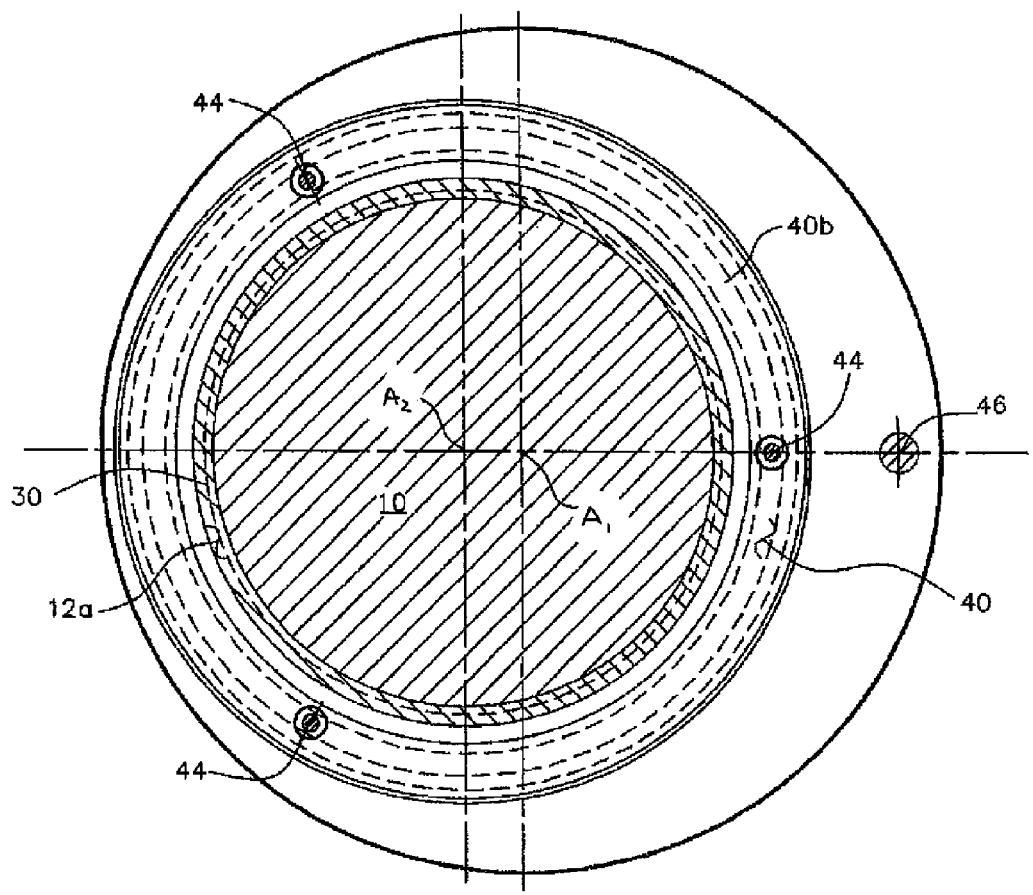
FIG. 3 is an enlarged cross sectional view taken through the seal assembly.

With reference additionally to FIGS. 2A, 2B and 3, it will be seen that the seal assembly includes a circular flinger 30 mounted on the shaft 10 for rotation therewith. The flinger is captured between a shoulder 32 on the shaft and the tapered sleeve 24, and includes radially outwardly projecting flanges 30a, 30b defining an axial space 34.

A seal plate 38 is fixed to the front housing plate 16a. The seal plate defines a circular opening aligned with the rotational axis $A_1$ of the eccentric cartridge 14.

A circular seal carrier 40 is rotatably supported in the circular opening of the seal plate 38. The seal carrier includes an integral first inner rim 40a, and a separate axially spaced second inner rim 40b. The inner rims 40a, 40b are arranged eccentrically with respect to the seal plate opening, are aligned axially with the rotational axis $A_2$ of the shaft 10, and project radially inwardly into the space 34 between the flanges 30a, 30b of the flinger 30. Ring seals 42 are carried by the first and second inner rims 40a, 40b of the seal carrier 40. The inner rims are resiliently urged apart to there by maintain the ring seals 42 in contact with the flinger flanges 30a, 30b. Preferably, the resilient forces required to do so are provided by Belleville washer assemblies 44 positioned at circumferentially spaced locations around the flinger 30.

A locating 46 pin projects from the seal carrier 40 into an opening 48 in the front face of the eccentric cartridge 14. The locating pin serves to rotatably fix the seal carrier to the eccentric cartridge, with the opening 48 being configured to accommodate pivotal movement of the pin 46.

In light of the foregoing, it will be understood by those skilled in the art that the seal assembly of the present invention offers significant advantages. For example, by resiliently urging apart the inner rims 40a, 40b of the seal carrier 40, the ring seals 42 are maintained in contact with the flinger flanges 30a, 30b throughout the useful life of the seals as they undergo normal wear. The seal carrier 40 is self aligning with respect to the roll shaft at all times and under all loading conditions.

The above-described embodiment of the present invention is merely descriptive of its principles and is not to be considered limiting. The scope of the present invention instead is to be determined from the following claims rather than by the foregoing description, and all changes and modifications which come within the meaning and range of equivalency of the claims are to be embraced therein.

What is claimed is:

1. A seal assembly between a housing and a rotatable shaft protruding exteriorly from the housing, the shaft being journalled for rotation about a first axis in an eccentric cartridge which in turn is rotatably adjustable about a second axis parallel to said first axis, said seal assembly comprising:

a circular flinger mounted on the shaft for rotation therewith about said first axis, said flinger having radially outwardly projecting flanges defining an axial space therebetween;

a seal end plate fixed to the housing and defining a circular opening aligned axially with the second rotational axis of said eccentric cartridge;

a seal carrier surrounding said flinger, said seal carrier being supported by said seal end plate, being rotatable in said circular opening, and having axially spaced first and second inner rims projecting radially inwardly into the space between the flanges of said flinger, wherein said seal carrier comprises a circular plate, said first inner rim comprises an integral part of said circular plate, and said second inner rim comprises a ring shaped component separate from and supported on an inner edge of said circular plate; said first and second inner rims being arranged eccentrically with respect to the circular opening in said seal end plate and being aligned axially with the first rotational axis of said shaft;

locating means for rotatably fixing said seal carrier to said eccentric cartridge, said locating means comprising a pin projecting from said seal carrier into an opening in said eccentric cartridge, said pin and said opening being configured to accommodate pivotal movement of said pin relative to said eccentric cartridge;

ring seals carried by the inner rims of said seal carrier; and means for resiliently urging said inner rims apart to thereby maintain said ring seals in contact with the flanges of said ringer.

2. The seal assembly of claim 1 wherein said means for resiliently urging said first and second inner rims apart comprises Belleville washer assemblies positioned between said inner rims at circumferentially spaced locations around said flinger.

\* \* \* \* \*